United States Patent [19]

Dickens

[11] 4,240,557
[45] Dec. 23, 1980

[54] POLYSTYRENE FOAM STRUCTURE
[75] Inventor: Luther I. Dickens, Radford, Va.
[73] Assignee: The Mead Corporation, Atlanta, Ga.
[21] Appl. No.: 973,914
[22] Filed: Dec. 28, 1978

Related U.S. Application Data

[63] Continuation-in-part of Ser. No. 698,966, Jun. 23, 1976, Pat. No. 4,144,296.

[51] Int. Cl.³ .............................................. A47F 5/00
[52] U.S. Cl. ..................................... 211/153; 108/901
[58] Field of Search ............................. 211/134, 153; 297/DIG. 1; 52/302.7; 108/901; 264/46.5, 45.4

[56] References Cited
U.S. PATENT DOCUMENTS

| 2,361,438 | 10/1944 | Turner | 52/309.7 X |
|---|---|---|---|
| 3,119,129 | 1/1964 | Evans et al. | 264/45.4 X |
| 3,511,191 | 5/1970 | Barry et al. | 108/901 X |
| 3,546,841 | 12/1970 | Smith et al. | 264/46.8 X |
| 3,604,748 | 9/1971 | Lamkemeyer | 297/DIG. 1 |
| 3,719,157 | 3/1973 | Arcocha et al. | 108/901 X |
| 3,915,098 | 10/1975 | Nania | 108/51.1 |
| 3,939,987 | 2/1976 | Bustos et al. | 211/49 R X |

Primary Examiner—James T. McCall
Assistant Examiner—Robert W. Gibson, Jr.
Attorney, Agent, or Firm—Harold L. Marquis

[57] ABSTRACT

A molded polystyrene foam wedge-shaped merchandise support with a plurality of reinforcing ribs with at least one transfer hole in each rib. The top, edges and sides of the support may be covered by a protective covering. The protective covering may be a thermoplastic sheet, such as an acrylonitrile-butadiene-styrene polymer, or a laminated fiberboard.

6 Claims, 5 Drawing Figures

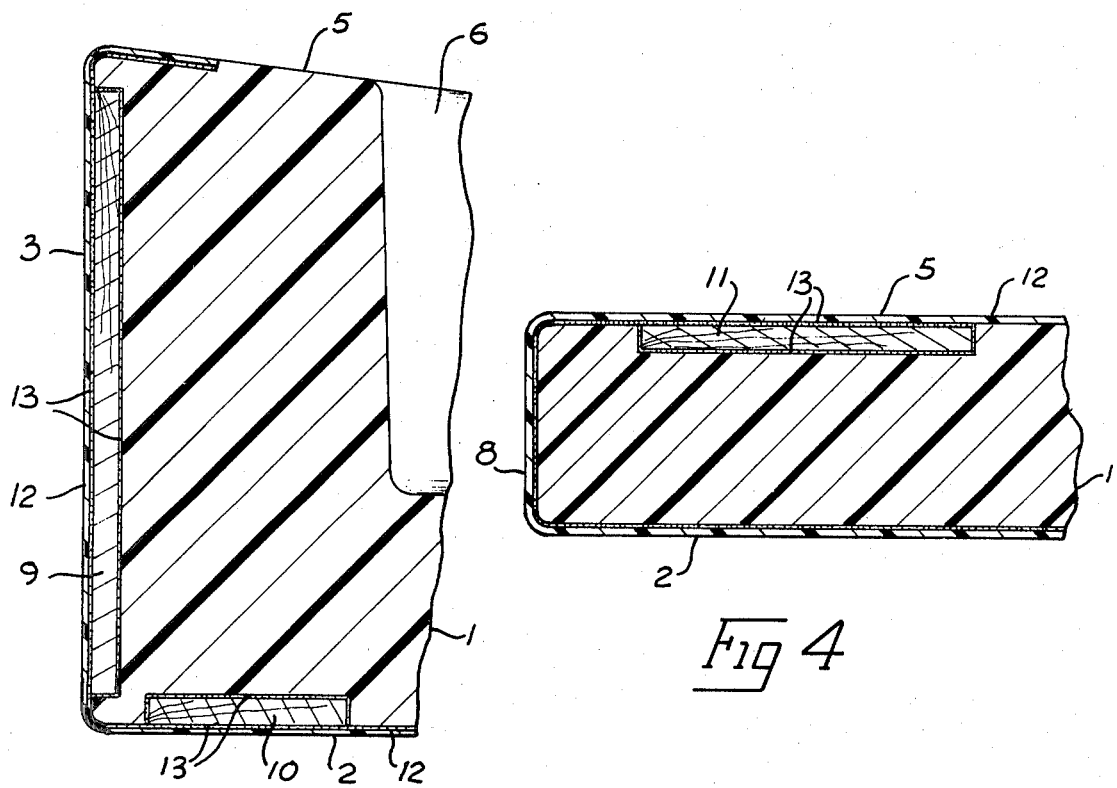

POLYSTYRENE FOAM STRUCTURE

BACKGROUND OF THE INVENTION

This application is a continuation-in-part application of U.S. patent application Ser. No. 698,966, filed June 23, 1976, now U.S. Pat. No. 4,144,296, which was allowed on Sept. 25, 1978.

Solid plastic foam structures have been used for some time as load-bearing supports, such as for merchandise supports as disclosed in Bustos U.S. Pat. No. 3,939,987. While such supports are lightweight and inexpensive, they suffer from two serious disadvantages. The plastic base does not have sufficient compressive strength to support a heavy load of merchandise. Secondly, the plastic foam is easily dented or torn during use. While reinforced sheet material, such as plywood, can be applied to the load-bearing surface of the support by adhesive tape, the case is not very attractive and the tape tends to loosen with use. The sheet material prevents the plastic base from denting, but does not increase the compressive strength except to the extent the load is more uniformly distributed over the base

SUMMARY OF THE INVENTION

In this invention a polystyrene foam support is molded with a plurality of reinforcing ribs. Each rib has at least one transfer hole to permit the polystyrene to be transferred throughout the support during molding so the density of the support is fairly uniform. The polystyrene foam support can be protected from tears and denting by bonding a protective covering to the top, edges and sides. This protective covering may be glued to the polystyrene foam support after it is molded. The protective covering may be a thermoplastic sheet, such as an acrylonitrile-butadiene-styrene polymer, or a laminated fiberboard.

Alternatively, the polystyrene foam structure can be molded in situ with a thermoplastic sheet bonded to a portion of the outside surface of the polystyrene. A thermoplastic sheet coated with a heat-activated adhesive is cut and folded into proper shape. The folded sheet is inserted into the female cavity of a mold. Several reinforcing ribs are attached to the male member of the mold. After the mold is closed, expandable polystyrene molding material is injected into the interior of the folded sheet and heated by steam to expand the polystyrene against the mold. This heating process also activates the adhesive to bond the sheet and polystyrene. The mold is then cooled and the formed structure removed.

DESCRIPTION OF THE DRAWINGS

FIG. 4 is a cross-sectional view along lines 4—4 of FIG. 1.

FIG. 5 is an enlarged view of area 5 of FIG. 2.

Figure 1:
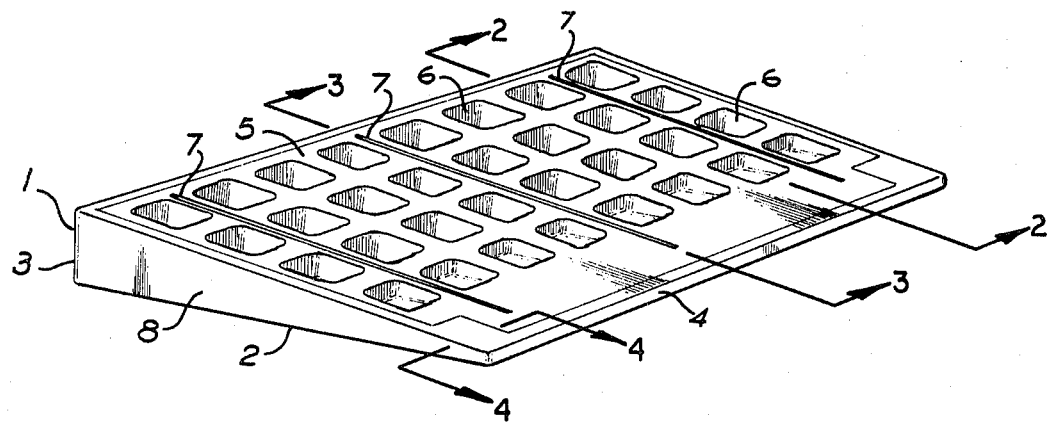
FIG. 1 is a perspective view of the bottom of a merchandise support base with a protective covering, which is the preferred embodiment of the present invention.
Figure 2:
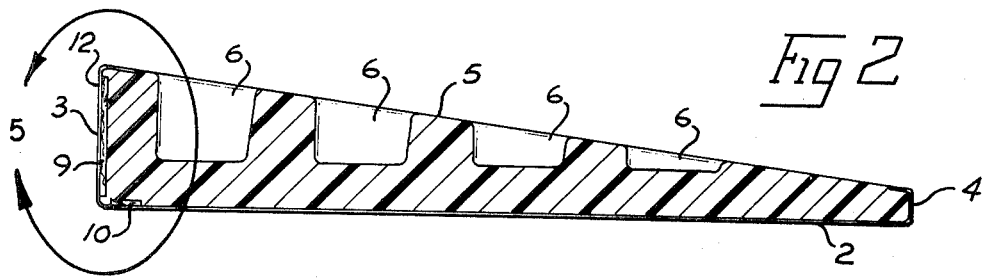
FIG. 2 is a cross-sectional view taken along lines 2—2 of IG. 1.
Figure 3:
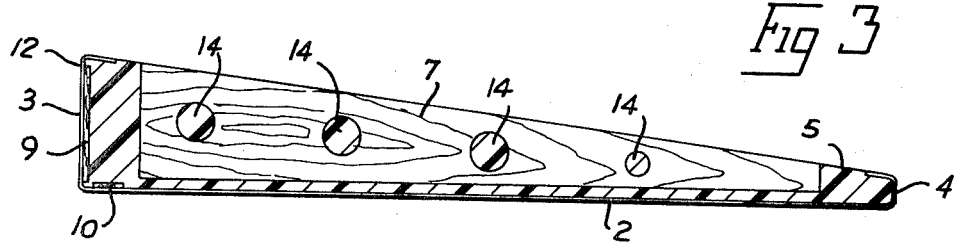
FIG. 3 is a cross-sectional view along lines 3—3 of FIG. 1.

The merchandise support base is shown in FIG. 1 as designated by reference number 1. It is constructed from polystyrene foam having a flat top 2 which tapers from a thick edge 3 to a thin edge 4. The bottom 5 of the base 1 is molded with cavities 6 to save material and reduce weight. Reinforcing ribs 7 of any relatively inflexible material, such as plywood or steel, are embedded in the polystyrene foam between rows of cavities 6 in spaced transverse relationship to the base 1 in order to strengthen the base. These reinforcing ribs 7 can also be located in spaced longitudinal relationship to the base 1. These reinforcing ribs 7 may not be needed in the fabrication of a foam support back which is otherwise constructed in the same way.

The top 2, edges 3 and 4, and sides 8 of the support are covered by a protective covering as shown in FIG. 5. The protective covering may also extend a short distance around the periphery of the bottom 5 of the support. A thermoplastic sheet or laminated fiberboard are good protective coverings. The thermoplastic sheet may be a polystyrene, polyethylene, polypropylene or rigid vinyl polymer. An acrylonitrile-butadiene-styrene polymer (commonly known as ABS plastic) is preferred.

In Situ Bonding of Sheet

The thermoplastic sheet can be bonded to a polystyrene foam support simultaneously with the molding of the support. In this process, the thermoplastic sheet (approximately 30 mil) is first die cut to the proper dimensions to cover the top, edges, and sides and a portion of the bottom. The sheet is then scored at the fold lines and a compatable heat-activated adhesive 13 (as shown in FIG. 5) is brushed or sprayed on the inside surface of the sheet. While a number of heat-activated adhesives can be used, a neoprene adhesive is preferred with ABS sheet. The sheet is then folded into proper shape. A bumper plate 9 of a relatively inflexible material such as plywood, wood, particle board, heavy paperboard or fabricated plastic, may be inserted on the inside of the thick edge 3 of the support to provide additional support and protection against damage when it is resting on the floor with the thick edge to the traffic. A similar top plate 10 may be used to protect the surface of the top 2 near the thick edge 3. The bumper plate 9 and top plate 10 may be a single unitary structure. The bumper plate 9 and top plate 10 are also coated with a heat-activated adhesive 13 as shown in FIG. 5.

A bottom plate 11 may be coated with adhesive and attached to the inside flap of the sheet on the bottom of the support. The bottom plates 11 are used to anchor fasteners which attach a similar back structure to the merchandise base.

The folded sheet is then placed in the female cavity of a steam chest mold with the interior of the folded sheet facing the male side of the mold. Several reinforcing ribs 7 are attached to the male side of the mold when fabricating a base. These ribs have transfer holes 14 to permit the transfer of the plastic foam material throughout the mold during the molding process so that the density of the foam is uniform. These ribs are supported by the rigid foam to prevent buckling, thereby increasing compressive strength of the unit. The mold is then closed and expandable polystyrene molding material is injected under pressure into the mold. The molding material may be in the form of powder, granules or beads. The molding material is preferably pre-expanded prior to its introduction into the mold. Steam is injected into the mold to soften and expand the polystyrene and to effect fusion of the polystyrene. The mold is vented to allow the circulation of the steam throughout the polystyrene. The expansion of the polystyrene forces the thermoplastic sheet tight against the mold surface. The interior of the female cavity may be heated to activate the adhesive but steam alone is usually sufficient. The mold is then cooled and structure removed. The expanded polystyrene has a density of from 1.5 to 2 lbs/cu. ft., which results in a light-weight structure.

This molding process can be used to produce polystyrene structures of other shapes. Applying the covering thermoplastic sheet in situ during the molding process produces a strong bond between the sheet and polystyrene. Pressure from the expanding polystyrene stretches the sheet so that a smooth surface is formed.

Subsequent Bonding of Covering

The support may be molded without any thermoplastic sheet simply by not including the sheet. The reinforcing ribs are attached to the male member of the mold as described above. The bottom plate 11 and the bumper plate 9 may be included if desired. Otherwise, the molding process is the same as described above. After molding, the structure can be used without any protective covering. The base support has the same construction as shown in FIG. 1 except for the absence of the protective covering 8.

If a protective covering is desired, it can be applied after molding. A thermoplastic sheet or laminated fiberboard can be die cut to cover the top, edges and sides and a portion of the bottom. The covering is scored at the fold lines and an adhesive applied on the inside surface of the covering. An adhesive that cures at room temperature is preferred. Among such adhesives are neoprene and latex based adhesives. The protective covering is then placed in position to cover the support. Double-edged tape can be used in place of an adhesive to secure any portion of the covering on the bottom of the support. After applying the covering, the support may be run through rollers to smooth any wrinkles in the covering. When the covering is applied, the base support has the same construction as shown in the Figures.

Many types of laminated fiberboard material of sufficient flexibility to be folded to the proper shape can be used as covering. The preferred embodiment uses a fiberboard approximately 0.09 inches in thickness. The first layer of the laminate which is next to the support is a kraft liner, with the second layer being paperboard. The next layer is a plastic film with a paper, preferable wood grain, on top thereof with a protective film on the outside. This fiberboard is laminated in a conventional manner. This laminated fiberboard is preferred because of its low cost and durability. It is especially attractive because it is wood grain.

Use of the Structure

A display rack can be constructed of the molded structure by locating the thick edge of one support on the thin edge of another support, as shown in Bustos U.S. Pat. No. 3,939,987. The back can be affixed to the base by fasteners attached to the bottom plate 11 of the back. The wedge shape of each support results in an approximately 90 degree angle between the back and base supports. The wedge shape of the base permits the merchandise on the base to tilt rearward making it more secure. It is generally not necessary to include reinforcing ribs or a bumper plate in the back support. Otherwise the back is of the same construction as the support base. Of course, it may be necessary to include reinforcing ribs in the back support if heavy merchandise is placed on the display rack.

Obviously, many other modifications are possible in light of the above teachings. It is therefore, to be understood that within the scope of the invention may be individual modifications and variations other than is specifically described.

The embodiments of the invention in which exclusive property or privilege is contained are defined as follows:

I claim:

1. A molded merchandise support constructed from polystyrene foam having a flat top, a thick edge, a thin edge, two sides interconnecting the two edges, and a bottom, said flat top and thick edge having at least a substantial portion of the surface covered by a protective covering bonded to the polystyrene foam, said support having a plurality of ribs for reinforcing the support in spaced relationship to each other, each rib having a depth at least equal to a major portion of the distance between the top and bottom and having a length so as to traverse at least a major portion of the distance between the thick and thin edges, each rib having at least one transfer hole filled with polystyrene foam, said transfer holes permitting the polystyrene to be transferred throughout the support during molding so the density of the support is fairly uniform.

2. The molded merchandise support of claim 1 in which the bottom has spaced cavities in rows and the reinforcing ribs are located between these rows.

3. The molded merchandising support of claim 1 in which the protective covering is a thermoplastic sheet.

4. The molded merchandise support of claim 1 in which the protective covering is an acrylonitrile-butadiene-styrene polymer thermoplastic sheet, and in which a bumper plate has been interposed between the polystyrene foam at the thick edge and the adjoining thermoplastic sheet.

5. The molded merchandise support of claim 1 in which the protective covering is a laminated fiberboard.

6. The molded merchandise support of claim 5 in which the bottom has spaced cavities in rows and the reinforcing ribs are located between these rows.

* * * * *